US006832191B1

(12) United States Patent
Frasca et al.

(10) Patent No.: US 6,832,191 B1
(45) Date of Patent: Dec. 14, 2004

(54) PROCESS FOR IMPLEMENTING A SPEECH RECOGNIZER, THE RELATED RECOGNIZER AND PROCESS FOR SPEECH RECOGNITION

(75) Inventors: Alessandra Frasca, Rome (IT); Giorgio Micca, Turin (IT); Enrico Palme, Bibbona (IT)

(73) Assignee: Telecom Italia Lab S.p.A., Turin (IT)

( * ) Notice: Subject to any disclaimer, the term of this patent is extended or adjusted under 35 U.S.C. 154(b) by 499 days.

(21) Appl. No.: 09/649,632

(22) Filed: Aug. 28, 2000

(30) Foreign Application Priority Data

Sep. 2, 1999 (IT) ........................................ TO99A0734

(51) Int. Cl.[7] .............................................. G10L 15/00
(52) U.S. Cl. ...................... 704/257; 704/256; 704/240; 704/8; 704/254
(58) Field of Search ................................ 704/256, 240, 704/8, 257, 254

(56) References Cited

U.S. PATENT DOCUMENTS

| | | | | |
|---|---|---|---|---|
| 5,625,749 A | * | 4/1997 | Goldenthal et al. | 704/254 |
| 5,995,919 A | * | 11/1999 | Chang et al. | 704/8 |
| 6,085,160 A | * | 7/2000 | D'hoore et al. | 704/256 |
| 6,167,377 A | * | 12/2000 | Gillick et al. | 704/240 |
| 6,460,017 B1 | * | 10/2002 | Bub et al. | 704/256 |

OTHER PUBLICATIONS

Deller et al., "Discrete–time processing of speech signals", ISBN 0–02–328301, Macillan, 1993, pp. 680–683.*
"On–Line Adaptive Learning of the Continuous Density Hidden . . . " Qiang Huo et al; IEEE Transaction on Speech and Audio . . . ; vol. 5, No. 2, Mar. 97; 12 pages.

A Multilingual Acoustic–Phonetic Model Based On . . . , Giorgio Micca et al, CSELT, Turin,IT, Universita di Pisa, IT . . . , no date.

"Multilingual Speech Recognition For Flexible Vocabularies" Bonaventura P. et al; CSELT Consultant, Turin,IT . . . ,Dipartimento di Elettronica e Inf. Universita de Padova IT . . . ; 5 pages.

"Speaker Adaptation of CDHMMs Using Bayesian Learning", Claudia Vair et al, CSELT Torino,IT; 3 pages, no date.

"In–Service adaptation of multilingual hidden–Markov–models"; Apr. 21, 1997; pp. 1451–1454.

"Continuous speech recognition with neural networks and stationary–transistion–acoustic units"; Jun. 9, 1997; pp. 2107–2111.

"Multi–Lingual Phoneme Recognition Exploiting Acoustic–Phonetic Similarities of Sounds"; Oct. 3, 1996; pp. 2195–2198.

* cited by examiner

Primary Examiner—Richemond Dorvil
Assistant Examiner—Qi Han
(74) Attorney, Agent, or Firm—Herbert Dubno

(57) ABSTRACT

To implement a speech recognizer for a language in conditions of substantial unavailability of related speech training material the first step (1,2) is, based on related speech training material, a multilingual speech recognizer (2) for a plurality of known languages. The recognizer for such given language (5) is then implemented by interpolation (4) starting from the said multilingual recognizer (2). The recognizer (5) generated in this fashion is susceptible of being subsequently refined based on related speech training material acquired online (4) during later use (FIG. 1)

17 Claims, 4 Drawing Sheets

PROCESS FOR IMPLEMENTING A SPEECH RECOGNIZER, THE RELATED RECOGNIZER AND PROCESS FOR SPEECH RECOGNITION

This invention addresses the techniques for speech recognition and in particular the issue of implementing a speaker independent automatic multilingual speech recognizer also suitable for languages for which speech training material is scant.

The invention is therefore targeted at being applied preferentially in situations where the use of automatic vocal recognition systems appears advantageous (such as at airport and rail station transit areas, shows and conferences, automatic vocal message controlled systems and the like for instance) and where recognition assurance is desired even when the speaker talks in a not particularly widespread language and/or in a language for which it is neither easy nor advantageous to collect the speech training material normally required for implementing a speech recognizer in a short time.

This invention has the purpose of supplying a speech recognizer of the type as specified above and according to the invention such purpose is achieved by means of a process having the features called out specifically in the claims that follow. The invention also concerns the recognizer for a given language implemented with this process as well as the multilingual recognizer created as an intermediate product of the process itself. Lastly, the invention also extends to the corresponding process for voice recognition.

Figure 1:
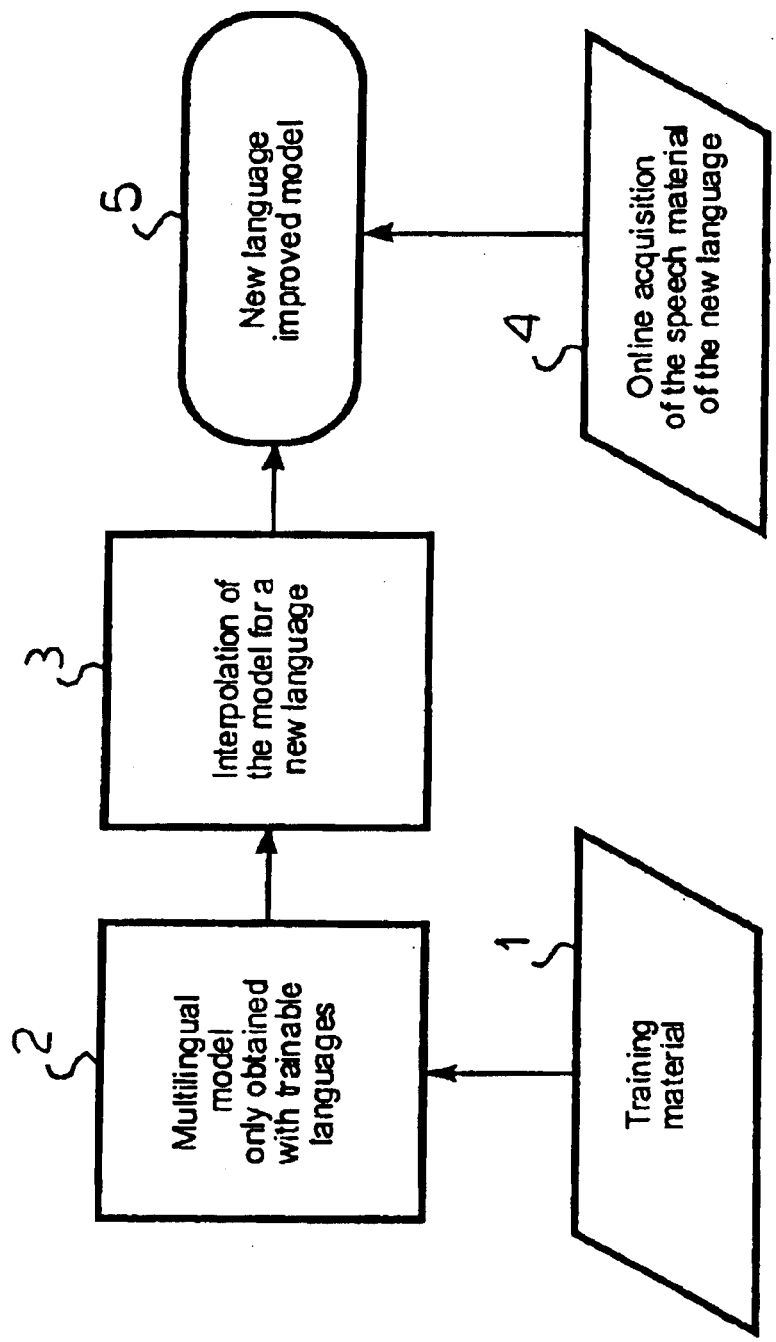

The invention will now be described as a not limiting example with reference to the enclosed drawings, in which:

FIG. 1 illustrates at the general level the subsequent steps into which the process according to the invention divides;

FIGS. from 2 to 4 illustrate the implementation of some of the steps shown in the blocks of FIG. 1 in greater detail as flow charts.

In essence, the solution according to the invention firstly includes the implementation as an intermediate product of an automatic multilingual speech recognizer in a situation in which an ample amount of speech material is available for all the languages involved. Such automatic multilingual speech recognizer is subsequently exploited to interpolate a sufficiently robust recognizer for a language for which large information databases are unavailable. In the invention implementation form preferred for the time being, the acoustic phonetic models used are of the transitory/stationary type. These are the models sometimes referred to as APUCD-CTS (Acoustic Phonetic Unit Context Dependent—Class Transitory Stationary) in juxtaposition to context independent models, also called APUCI (Acoustic Phonetic Unit Context Independent).

In the presently preferred implementation form, implementation of the recognizer according to the invention involves completion of the steps represented in a general form in blocks 1 to 5 of FIG. 1.

In particular, a multilingual recognizer model is first generated obtained only with trainable languages (block 2), after acquisition of the related training material (block 1).

The model for a new language for which the amount of speech training material is scant (block 3) is then interpolated starting from such multilingual recognizer model.

A recognizer model of the new language (block 5) is generated based on the result of the above interpolation and the possible online acquisition of the corresponding speech material (block 4). Such model is preferably improved based on the speech material acquired online.

GENERATION OF A RECOGNIZER FOR TRAINABLE LANGUAGES

Figure 2:
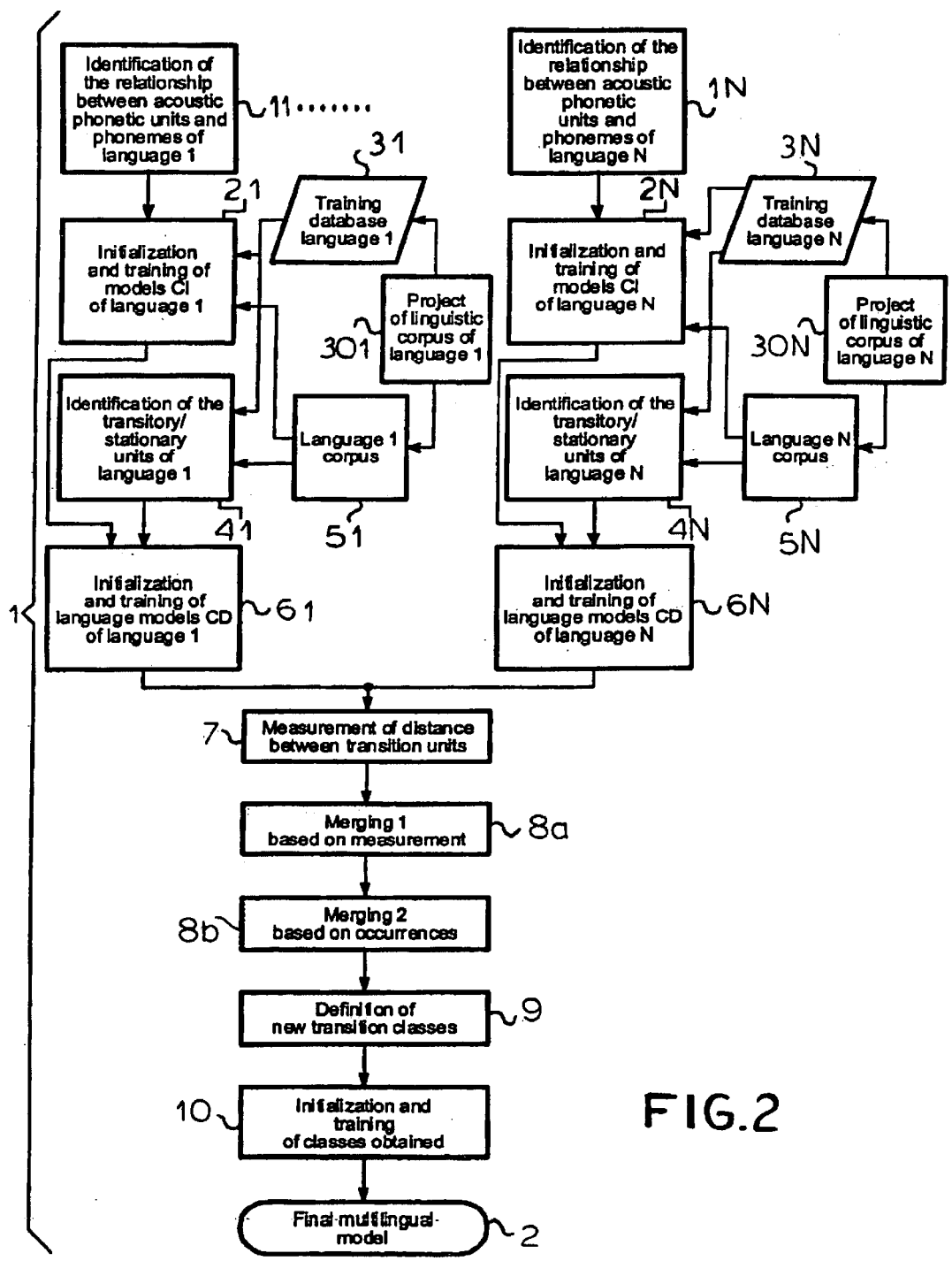

Such generation action essentially corresponds to blocks 1 and 2 of FIG. 1 and the flow chart of FIG. 2.

The upper part of this flow chart includes a series of N processes referred to a plurality of N start languages recognized as trainable languages, that is to say as languages (Italian, Spanish and the like for instance) for which a great amount of speech material is available. Reference can usefully be made for an introduction to the topic of multilingual speech recognition to the papers "Multilingual Speech Recognition For Flexible Vocabularies" by P. Bonaventura, F. Gallocchio and G. Micca—presented at the EuroSpeech '97 Conference of Rhodes, Greece, Sep. 22–25, 1997, and published at pages 355–358 of the Conference Proceedings and "A Multilingual Acoustic-Phonetic Model Based on Phone-to-Phone Transition Classes" by G. Micca, E. Palme and J. Mari—presented at the ICPhs '99—San Francisco USA, Aug. 1–7, 1999 and published in Volume 3, pages 1677–1680 of the Conference Proceedings.

The latter paper moreover predicts the idea of interpolating the hidden Markov models of a language for which speech training material is unavailable by mapping its phonological structure in a set of multilingual acousfic-phonetic units. This previous document however leaves the problem of optimum identification of such units unresolved and secondarily also the issue of practical implementation of the said mapping.

To return to the flow chart of FIG. 2, it will be appreciated that first step processing is separate for each individual language so the related initial models are not multilingual but specific for each language.

An initial step (represented by blocks 11, . . . , 1N for the various languages) consists of identifying the context independent (CI) units related to the phonemes of the respective languages. Hidden Markov models (HMM) are generated for these units by initializing and training (steps 21, . . . , 2N—always with reference to the N languages considered above).

This occurs by taking the available data from respective training databases 31, . . . , 3N related to the corresponding language. Context independent models are subsequently used as a starting point for the definition, initialization and training of transitory/stationary type units where context dependent transition units represent transition between one phoneme and the next and the stationary part corresponds to the more stable and central component of implementation of such phonemes that continue to be context independent models.

Initialization of the transition unit in terms of the stochastic structure of Markov models is important to ensure good convergence of the repetitive training process to a optimum point as described in the paper by G. Micca et al. mentioned previously.

The definition of these new units is represented by steps 41, . . . , 4N of the flow chart of FIG. 2 and involves reference to the language corpus 51, . . . , 5N (the project for which is represented by blocks 301, . . . , 30N) of the respective language. This is also dependent on data from the related database 31, . . . , 3N already used for initializing and training models at steps 21, . . . , 2N.

The introduction of these units makes the recognizer more precise as it is based on more specific models. Computation requirements tied to the increased number of models and training possibility needs must however also be taken into consideration. Some transition models can in fact be rare and the amount of speech material for their training can be insufficient to ensure proper model initialization and training in the various languages (step 61, . . . , 6N).

Computational requirements become important especially when multilingual speech recognizers are to be created and the cardinal value of the languages involved increases. The sequence of steps represented for each language involved from steps 11 to 61, . . . , 1N to 6N corresponds to the implementation of processing operations already known in the literature per se and therefore such as not to require detailed description during the description of this invention.

The second part of the speech recognizer creation process is based on merging the transitions obtained previously and specific for each language into classes. This operation is completed by adopting clustering techniques that no longer take account of the language of origin, but are based on the concept of distance between models and are also directed at solving the problem of under-training of the models of some transitions.

Reference can be made to the papers already mentioned previously for defining the concept of distance, also for model initialization of the transition classes obtained with a similar procedure to the one used for initializing pure transitions.

Block 7 of FIG. 2 represents measurement of the distances between transition units referred to the complex of N initial languages.

The subsequent merging operation is a procedure in two-steps, represented respectively in blocks 8a and 8b.

The first step (8a) is based on an initial criterion that starts from the transitions closest in terms of distance and merges them into increasingly big classes only when all the transitions to be merged are at less than a given threshold distance from the other components of the same class.

In this connection, it should be noted that the distances between the various models do not make up an equivalence ratio, as they do not have a transition property. Numerical identification of this threshold thus occurs in such a fashion as to make the number of units the multilingual model consists of susceptible of being processed without loss of specificity in representing acoustic-phonetic models.

The second merger criterion (step 8b) is directed at overcoming the problem of "rare" transitions not included in any class based on the criterion adopted at step 8a. Rare transitions are therefore added to one of the classes already created or to a new class created for this purpose. This is accomplished by identifying the transition closest to the rare transition and when such transition has already been added to a class and is trainable enough, by forcing the merger even when the distance requirements accounted for at step 8a have not been respected. If however the transition in question is close to another transition that does not belong to a class, the two transitions are used to create a new class.

If the transition or class into which the rare transition is to be merged is not trainable, other transitions closer to the one in question are looked for and so on until a transition or class satisfying the trainability requirement is found. For the sake of completeness, it is pointed out that a transition or class is defined as trainable if it appears in the training database a sufficient number of times to obtain a robust model.

The structure of the transition classes obtained with this procedure is not longer changed even in the presence of scantily trainable classes. Experiments conducted so far by the Applicant in fact confirm that untrainable classes are a rare occurrence and therefore little significant in terms of performance. Moreover, the hypothetical absorption of the class in question into another class would involve the introduction of quite a complex merger criterion.

Blocks 9 and 10 represent the steps leading to definition of new transition classes on the one hand and to initialization and training of the classes obtained on the other. Block 10 output identifies generation of the multilingual recognizer model identified by block 2 in the diagram of FIG. 1.

A characteristic feature of the multilingual recognizer described is the fact that although the trend is to initialize the process by attempting as ample as possible a coverage of all transitions between the various phonemes of a language it cannot be excluded that some words of the vocabulary of a given general recognition application generate new transitions not present in the initial models. This event is less probable as more attention is given in defining the language corpus 51 . . . , 5N of the training database that must guarantee as ample coverage as possible of all the phonetic phenomena susceptible of being represented in a given language. This on particular holds true for the project of the language corpus represented by blocks 301, . . . , 30N. In general, the solution of repeating the process in the presence of new transitions does not appear particularly attractive or advantageous especially if the new transitions make up a limited whole versus total start transitions.

Greater efficiency is consequently obtained with minimum performance if the target is to approximate new transitions to those already available. The process used for finding the replaced transition is based on stationary parts and not on transitions. The objective is to replace the right or left phoneme or both those making up the new transition with other phonemes close in space and belonging to the same language. This continues until a transition is obtained that already exists in the initial model and is susceptible of being inserted into a multilingual class. A methodology of this type is described in the paper by G. Micca et al. already mentioned previously.

GENERATION OF THE RECOGNIZER FOR UNTRAINABLE LANGUAGES

Once the multilingual speech recognizer has been obtained for the N languages for which ample speech material is available (trainable languages), the same recognizer is used for recognizing another language (hereinafter defined as new) for which one is in "conditions of substantial unavailability of speech material". This means that the speech material available for this language is very scant or in actual fact practically non-existent.

In the first case, (represented by the flow chart of FIG. 3), the assumption is made that a quantity of speech material sufficient is available to train the context-independent acoustic phonetic units (CI—that are no more than some ten units for one language) but inadequate to train hundreds of transition units.

Figure 3:
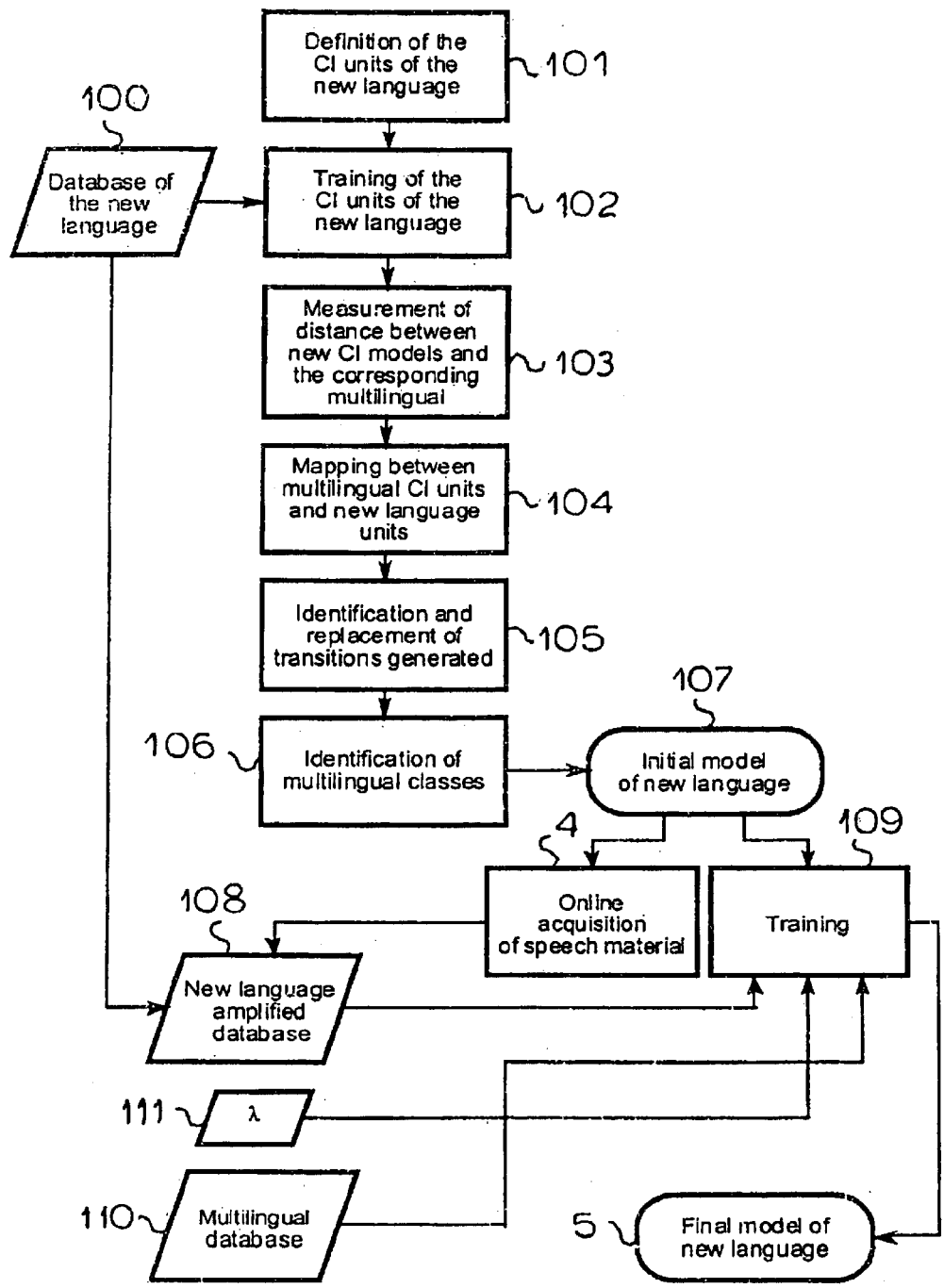

The related database available is represented by block 100 of FIG. 3.

In the second case (represented by the flow chart of FIG. 4), the assumption is made that the available speech material is so scant as to make it impossible to train the first type of model. This speech material is represented in the dotted lines of block 100' of FIG. 4. Block 100" of the same figure represents a test stage during which the speech materials from block 100' is used to check speech recognizer 107 better described later on. The purpose is to achieve refinement of the mapping stage represented by block 104, also subject to be described better later on.

Database 100' and its test 100" are susceptible of being developed for instance by collecting a limited set of speech samples from speakers of the "new" not completely trainable language. For instance, in the case of an application for an airport or a similar transit area it can be envisaged that the above set will be collected from persons accessible at such place and who speak the new language.

In essence, the recognizer according to the invention does not use, at least at the design stage, any acoustic data of the new language but exploits the similarity between the phonological system of the new language and that of the various languages making up the multilingual model obtained during the previous stages.

The attempt is first made to identify with prior knowledge anyhow available for each phoneme of the new language the most similar one belonging to one of the other languages. For instance, the phoneme represented by the same symbol IPA (International Phonetic Alphabet) or SAMPA (Speech Assessment Methods Phonetic Alphabet) is associated; the latter alphabet is a transcription of the IPA symbols into ASCII symbols non extending from number 7 to number 127. This transcription was applied for the first time in 1989 to the languages of the European Union and was subsequently extended to other languages as well.

As an alternative or in addition, if mother tongue speakers are available, a certain sound is analyzed in frequency to identify the most similar one from the spectrum point of view. This approach is very useful, especially for comparing the first two frequencies making up a vowel to find the vowel belonging to one of the languages of the multilingual model approximating it the most.

Figure 4:
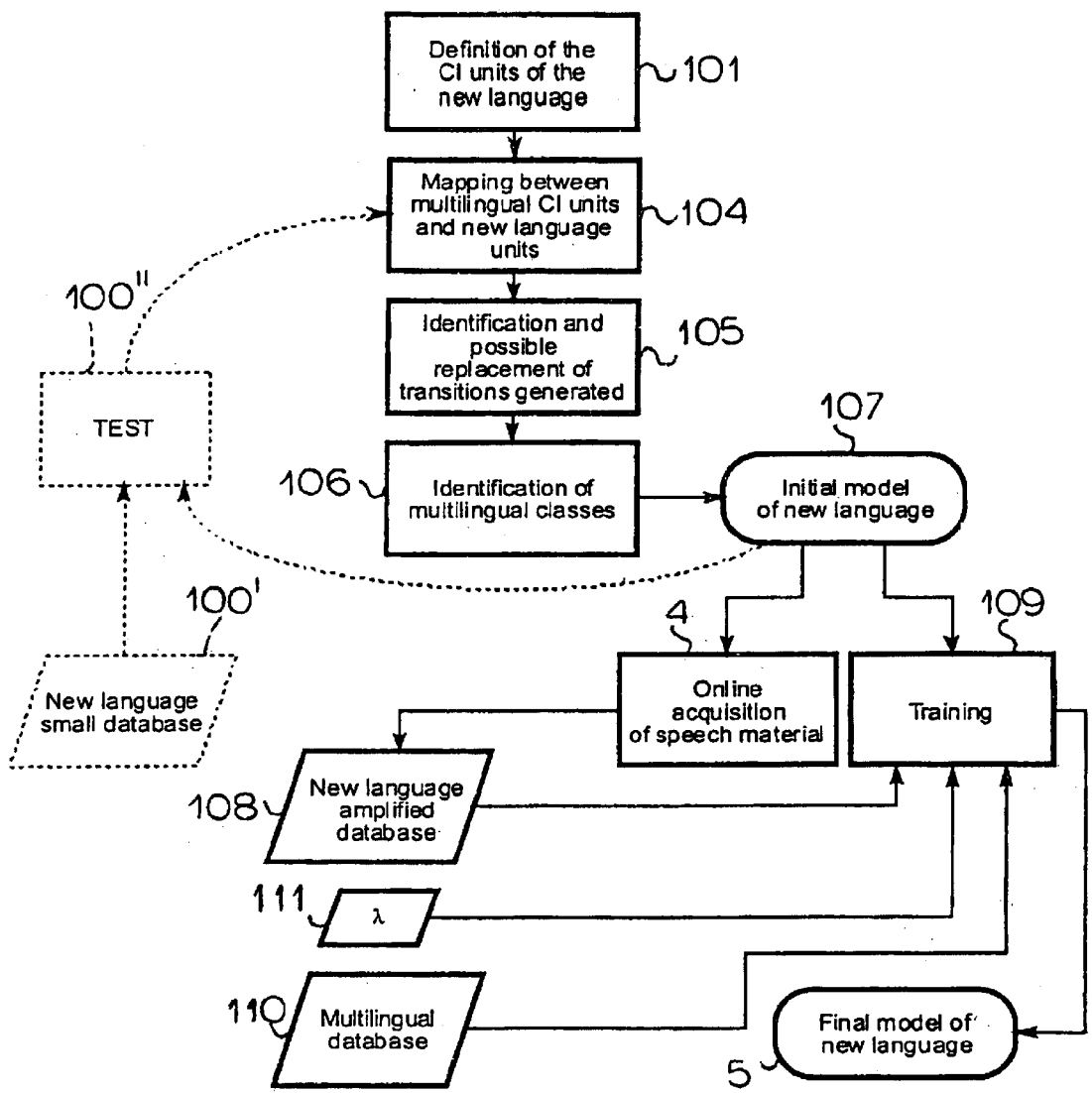

Passing on to illustrate in detail the flow charts of FIGS. 3 and 4, step 101 represents in both the step during which (after obtaining correspondence of the sound of the new language and those of the multilingual recognizer making up the result of step 2 of FIGS. 1 and 2) the context-independent (CI) units of the new language are initialized with the models of the units they have been associated to. An albeit limited performance recognizer is obtained in this fashion.

Improved performance can be obtained by introducing transition/stationary models. Transition models are multilingual and present a double degree of generality useful for the purpose set: ample coverage and greater robustness. In fact, since they are derived from the union of phonological systems of N languages, these models guarantee coverage of sounds of the new languages with a degree of precision that increases in proportion to the number N of languages making up the system. Moreover, the models under review represent an ample phonetic and acoustic space versus the space obtainable based on monolingual transitions. These models in fact contain information related to several languages so the probabilities that any sound of the new language finds a sufficiently representative model increase.

The more the multilingual model consists of sounds best approximating the sounds of the new language the better the performance of the system. The neo-Latin language of Rumanian for instance is closer to a multilingual model consisting of Italian and Spanish than German, which has a rather different phonological structure from the other languages considered. In this perspective, it is even more evident that by increasing the number of languages used for defining the multilingual model the possibilities of finding sounds close to one of the sounds of the new language increase.

The steps indicated with references 102 and 103 of the diagram of FIG. 3 correspond respectively to training of the units independently of the context of the new language, based on the information obtainable from database 100 and measurement of the distance between the new context-independent models and their multilingual correspondents.

Correspondent steps are obviously not provided in case of adoption of the training action represented by the flow chart of FIG. 4 which can essentially be seen as a sort of "blind" training.

Since the phonemes of the new language are initialized with acoustic phonetic units belonging to several languages and the phonological structure of each language enables comparisons between sounds not allowed in other languages, non-monolingual transitions can be generated between sounds of the same language not present in any word of the vocabulary of the latter. In both cases transitions are obtained which are not included in the original transitions with which the recognizer was built.

The strategy adopted to identify a transition included among the original one and susceptible of being replaced instead of the missing transition is the same one as described previously for the replacement of new transitions that can be created when the recognition vocabulary is increased.

The steps implementing mapping between multilingual context-independent units on the one hand and units of the new language and identification and possible replacement of transitions generated on the other hand are represented by steps 104 and 105 of both flow charts of FIGS. 3 and 4.

Further evolution of the system is towards a step 106 where multilingual classes are identified. All this to achieve definition of a model 107 of a recognizer of the new language based on multilingual model 2.

A minimum of speech material is required to try out associations made and check the degree of recognition of the words of the languages trained, by changing choices made if polarization of errors towards certain sounds is noted. Once the system is operated, performance can be improved by using the speech material naturally produced by system use by mother tongue speakers.

In conformity with FIG. 1, this online acquisition function of speech material was represented with block 4 in both the flow charts of FIGS. 3 and 4.

This speech material acquisition function is directed at making up a database for the new language, identified with 108. Database 108 is susceptible of being used for a training function (block 109) directed at further refining the model of the new language jointly with a multilingual database 110. All this is to originate an improved model of the new language (identified by reference 5 in both flow charts of FIGS. 3 and 4 and in the diagram of FIG. 1).

The online speech material acquisition function represented by block 4 interacts directly (practically in real time and anyhow during system operation) with database 100 of the new language by acting on database 108 that is continuously updated as a result of the online acquisition of speech material. This possibility is particularly advantageous when the system is used to enable collection of a quantity of speech material sufficient to train models based in the criterion of retroaction described.

If the material comes from a limited number of speakers, models can be so polarized as to no longer be independent of speakers. Obviously, the more adequate the initial model, the greater the convergence towards a statistically solid model.

If the speech material is enough for training at least context-independent units, only transitions are initialized with models not belonging to the new language. Moreover, measuring the distance between the models of the new language and the multilingual one so that replacement is more precise performs identification of the transitions to be replaced.

Subsequent training (block 109) can be targeted at strengthening the recognizer in the new language, which is obtained by weighting the information obtained from the reduced amount of speech materials available for the new language more than the information available for the other N languages. This approach is based on the introduction of a parameter $\lambda$ (with $0 \leq \lambda \leq 1$) that weighs with a value $(1-\lambda)$ the information brought from the N languages of the initial multilingual model and with $\lambda$ the information conveyed by the speech material of the new language.

This weighting function (block 111) is connected to methods already applied for adapting speech recognition system to the speaker and/or the channel. Cf. for instance works by Q. Huo, C. H. Lee: "Online adaptive learning of the continuous density hidden Markov model based on approximate recursive Bayes estimate", IEEE Transactions on Speech and Audio Processing, Volume 5, Number 2, pages 161–172, 1997 and by C. Vair, L. Fissore: "Speaker adaptation of CDHMMs using Bayesian learning" and in "Computational Methods of Speech Pattern Processing", NATO-ASI Series F: Computer and Systems Sciences, Volume 169, Springer-Verlag, pages 78–83, 1999.

The model of the new language $M_{ln}$ obtained with this adaptation operation is the result of optimization with respect to parameter $\lambda$ that can be represented with the following formula $$M_{ln} = f(M_{ml}, I_{ln}, \lambda)$$

where $M_{ml}$ is the initial multilingual model, $I_{ln}$ is the information extractable from acoustic data acquired in the new language and $M_{ln}$ is the resultant model for the new language referable to block 5 of FIGS. 1, 3 and 4. Parameter $\lambda$ can be optimized in agreement with the formulae or re-estimation of the parameters of HMM models of the MAP (Maximum A Posteriori) technique described in the works mentioned.

The model of recognizer 5 obtained according to the procedures described previously can be incorporated into any multilingual automatic speech recognition system for the completion of any function susceptible of being competed by such recognizer. The related speech recognition process is therefore implemented based on this recognizer, with the possibility (described in particular with reference to block 4) of having such process also include online acquisition of the speech material for the new language.

Of course, the principle of the invention remaining unchanged, details and forms of implementation can change markedly versus what has been described and illustrated, without such changes leaving the scope of this invention.

What is claimed is:

1. A process for implementing a speech recognizer for a given language (5) in conditions of essential unavailability of training speech material for such language, comprising the steps of:

creating a multilingual speech recognizer (2) for N known languages based on related training speech materials available for such known languages, such multilingual speech recognizer (2) being created by identifying, for such known N languages, respective sets of context dependent models as respective transitions and merging the transitions of such respective sets into classes of transitions of the multilingual recognizer (2), such merging being performed independently of the respective known language of the transitions and as a function of the distance between transitions, and modifying said multilingual recognizer for the given language in the conditions of essential unavailability of training speech material by interpolation staring from said multilingual recognizer, said interpolation including the operation of initializing context-independent units (CI) of such given language with an operation of associations with unit models of such multilingual recognizer (2), and comprising the steps of: defining (101) context-independent units (CI) of such given language, implementing such association operation as mapping (104) between previously defined context-independent units (CI) of such given language and the context-independent units (CI) of such multilingual recognizer so as to generate as a recognizer for such given language (5) the recognizer resulting from such mapping operation (104), wherein said associated units are used to obtain transition models of the given language and subsequently transition classes of said multilingual recognizer, and wherein transitions not included between transitions of the languages of said plurality of N languages are approximated with respective approximation transitions comprised in the transition classes of the multilingual recognizer (2), the approximation to include the operations of:

identifying at least one phoneme between a right and a left phonemes defining the transition not included in the transition classes of the multilingual recognizer, and replacing at least one of said right and left phonemes with at least one respective replacement phoneme close in distance and belonging to a transition included in the transition classes of the multilingual recognizer (2) until a transition included in the transition classes of the multilingual recognizer (2) is reached as an approximation.

2. The process according to claim 1, wherein said multilingual recognizer (2) is created by identifying context-independent acoustic phonetic units and correlating such context-independent units with the phonemes of the known languages of such plurality of N languages.

3. The process according to claim 2, which further includes the step of generating hidden Markov models (HMM) for said context-independent units (CI).

4. The process according to claim 3, which includes the operation of identifying respective transitory/stationary type units starting from said context-independent units (CI).

5. The process according to claim 4, wherein said transitory/stationary type units are modeled starting from said hidden Markov models.

6. The process according to claim 5, wherein said transitory/stationary type units transitions represent transition between a phoneme and a subsequent one while the stationary part corresponds to a central stable part of the implementation of such phonemes.

7. The process according to claim 1, wherein said merging step includes at least an initial step (8a) in which merging is pursued into the transition classes of multilingual recognizer (2), of the transitions whose distance from the other components of the same class is less than a given threshold.

8. The process according to claim 7, wherein said threshold is identified according to the number of units making up the multilingual recognizer (2).

9. The process according to claim 8, wherein said merging step includes at least a second step (8b) pursuing the merging into classes of transition of multilingual recognizer (2), of transitions not yet merged in said initial step (8a).

10. The process according to claim 9, wherein said second step (8b) pursues the merging of said transitions not yet merged into the respective classes of transitions of the multilingual recognizer (2), said classes being selected from:

the given class attributed to the transition closest to the transition not merged yet, a new class generated starting from such transition not merged yet and from such closest transitions when the latter has not yet been merged with any class, and if such given class and such new class are not trainable enough, a further given selected class.

11. The process according to claim 1, wherein in the presence of new transitions for said known languages of said number (N) of known languages, the new transitions are approximated with respective transitions already identified, such approximation being inclusive of:

identifying at least one among the right and left phonemes defining the new transition, and replacing at least one of said right and left phonemes with a respective replacement phoneme close in distance and belonging to the same language of the plurality of N known languages until a respective already identified transition is obtained as an approximation.

12. The process according to claim 1, wherein said interpolation includes the operation of identifying, by a prior knowledge and for the phonemes of that given language, a closest respective phoneme belonging to one of the known languages of a said plurality of N languages.

13. The process according to claim 1, wherein said interpolation includes the operations of:

collecting speech material of speakers using such given language, and analyzing such speech material in frequency to identify for the sounds of such language a closest respective sound comprised in the given set of phonemes of said plurality of N languages.

14. The process according to claim 1, applicable to the generation of a recognizer for a given language (5) for which a set of training information (100) is available, which includes among the operations of defining (101) the context-independent units (CI) of the said given language and such association by mapping (104) at least one of the operations of:

training (102) the context-independent units (CU) of said language based on the training information of such set, and measuring (103) the distance between the context-independent units (CI) of such given language and the correspondent multilingual models.

15. The process according to claim 14, which includes the operation of refining said recognizer for such given language (5) by acquiring speech material (4) for such given language.

16. The process according to claim 15, wherein said speech material related to the said given language is acquired interactively (4) with said training information (100) in view of the development of an increased database (108) for such given language.

17. The process according to claim 15, wherein said recognizer for the said given language (5) is subjected to refining during a training step (109) performed in a weighted function ($\lambda$) of the speech material available for such given language and for the known languages of the said plurality of N languages.

* * * * *